(12) United States Patent
Hendey

(10) Patent No.: US 6,931,946 B1
(45) Date of Patent: Aug. 23, 2005

(54) LARGE VOLUME FIRE SERVICE WATER METER

(76) Inventor: Arthur A. Hendey, P.O. Box 529, Beaumont, CA (US) 92223

( * ) Notice: Subject to any disclaimer, the term of this patent is extended or adjusted under 35 U.S.C. 154(b) by 0 days.

(21) Appl. No.: 10/883,260

(22) Filed: Jul. 2, 2004

(51) Int. Cl.[7] .................................................. G01F 1/05
(52) U.S. Cl. .................................................. 73/861.79
(58) Field of Search .................... 73/861.79; 210/96.1, 210/198.1, 87

(56) References Cited

U.S. PATENT DOCUMENTS

| | | | |
|---|---|---|---|
| 6,345,541 B1 * | 2/2002 | Hendey | 73/861.79 |
| 6,447,677 B2 * | 9/2002 | King | 210/198.1 |
| 6,645,373 B2 * | 11/2003 | Gruca | 210/96.1 |

* cited by examiner

Primary Examiner—Edward Lefkowitz
Assistant Examiner—Jewel V. Thompson
(74) Attorney, Agent, or Firm—Morland C. Fischer

(57) ABSTRACT

A large volume water meter having particular application for use with a fire suppression system by which to measure the volume of water consumed by a residence during periods of calm and during a fire emergency when water is supplied from a source at high speed to a sprinkler system in order to combat a residential fire. The water meter has a dual element strainer assembly including an outer strainer to trap sand and other suspended particles and an inner strainer surrounded by the outer strainer and arranged in spaced coaxial alignment therewith. An adjustable flow control turbine assembly having a rotor that is responsive to the water flow is received within the inner strainer. The turbine assembly and the dual element strainer assembly are coupled to one another within the water meter so as to produce an uninterrupted stream of water by way of radial and axial flow paths through the strainer assembly to the turbine assembly.

19 Claims, 3 Drawing Sheets

LARGE VOLUME FIRE SERVICE WATER METER

BACKGROUND OF THE INVENTION

1. Field of the Invention

This invention relates to a large volume water meter and, in particular, to a fire service water meter to be integrated in a fire suppression system of the kind commonly including a sprinkler system by which to combat a residential fire. A dual element strainer assembly which is adapted to handle a large volume of water is coupled to a turbine assembly so as to provide an accurate measurement of water consumption and an uninterrupted flow of water in cases of a fire emergency.

2. Background Art

Water meters have long been employed to measure the volume of water that is consumed by a residential or commercial user by way of a water service pipe line. In areas of rapid residential growth (e.g., Las Vegas), many new houses, apartments and condominiums are being built very close together on narrow streets. Because of the high density of such new residential structures, it is becoming increasingly difficult for fire emergency vehicles to gain immediate access to a fire in a distant structure which is set back from a narrow roadway. To overcome this potential problem, many new residential building are now being constructed with a water sprinkler system as part of a fire suppression system. The prompt response by a sprinkler system to a residential fire will be especially advantageous for both persons and property in those cases where a response by the local fire department could be delayed or hampered by the inability of a fire truck to get close enough to a structure in order to adequately fight a fire raging therewithin.

In this regard, standard positive displacement water meters are being used to monitor the consumption of water by a residence during periods of calm as well as during a fire emergency when the sprinkler system is activated. In the rare event of a residential fire, the volume of water which is consumed in a short time is significantly higher than the volume of water to be consumed by the same residence during periods of calm. However, the conventional positive displacement water meter includes a measuring chamber which, in some cases, may not be able to handle the large rush of water that would typically be required for a sprinkler system to suppress a residential fire.

That is to say, high speed, high volume water flow has been known to cause a lock-up of the measuring chamber of a conventional positive displacement water meter. In some cases, the existing strainer associated with a conventional water meter is small and might become plugged by sand or similar particulate matter that is carried by the water flow. In other cases, flow restrictions are introduced which can result in a pressure head loss at the inlet side of the meter which can have a negative impact in the rate at which water flows from the outlet side. In any event, the water meter may malfunction or be otherwise rendered incapable of providing a continuous high volume, high speed flow of water as would be required by a fire suppression system to fight a residential building fire.

Therefore, what is needed is a water meter that can be used in conjunction with a fire suppression system and which has a measuring chamber that is unlikely to become plugged or cause a failure of the water meter during emergency situations when a large volume of water traveling at high speed must be measured and supplied to a sprinkler system for fighting a residential building fire.

SUMMARY OF THE INVENTION

In general terms, a water meter is disclosed herein which is especially suited for use in conjunction with a fire suppression system by which an uninterrupted stream of water can be provided to a sprinkler system during an emergency situation at times when a large volume of water is required to adequately suppress a (residential) building fire. The fire service water meter includes a hollow body within which an adjustable flow control turbine assembly is coupled to a dual element strainer assembly. The turbine assembly includes a rotor having a set of impeller blades and a base having a rotor shaft upon which the rotor is mounted for rotation so as to provide an indication of the volume of water consumed by a residential user during both normal and emergency situations. The base of the turbine assembly also includes a series of flow passages and a number of variable size water inlet orifices formed therein by which the volume of water flowing through the turbine assembly to the rotor thereof can be selectively controlled.

The dual element strainer assembly includes a basket-shaped inner strainer and a cylindrical outer strainer. The basket-shaped inner strainer has an open top and a perforated bottom. In the assembled configuration, the inner strainer is located at the interior of the outer strainer, and the turbine assembly is received at the interior of the inner strainer. A series of ribs runs longitudinally along the interior of the outer strainer so as to engage the inner strainer and thereby hold the inner strainer in spaced coaxial alignment with the outer strainer. The ribs extend below the outer strainer so that the strainer assembly rests upon and stands upwardly from a strainer assembly support plate to which a pressure is applied by the bottom plate of the water meter. A plurality of openings are formed through the sides of each of the inner and outer strainers of the dual element strainer assembly. The openings through the outer strainer are larger in area than the openings through the inner strainer. Accordingly, a relatively large radially and axially extending flow path is established to the rotor of the turbine assembly within the inner strainer by way of the holes formed in the sides of the strainer assembly as well as the perforated bottom of the inner strainer.

By virtue of the dual element strainer assembly within which the turbine assembly is received, sand and similar particulate matter will be removed from the water so as not to impede the flow to the rotor. In this same regard, the holes formed through the inner and outer strainers and the perforated bottom of the basket-shaped inner strainer provide a large path along which water can flow to the turbine assembly. Accordingly, there is less likelihood that the strainer assembly will become plugged or that the water pressure through the turbine assembly will drop so as to avoid a failure of the water meter and assure an uninterrupted stream of water in both normal and emergency situations.

DESCRIPTION OF THE PREFERRED EMBODIMENT

Figure 1:
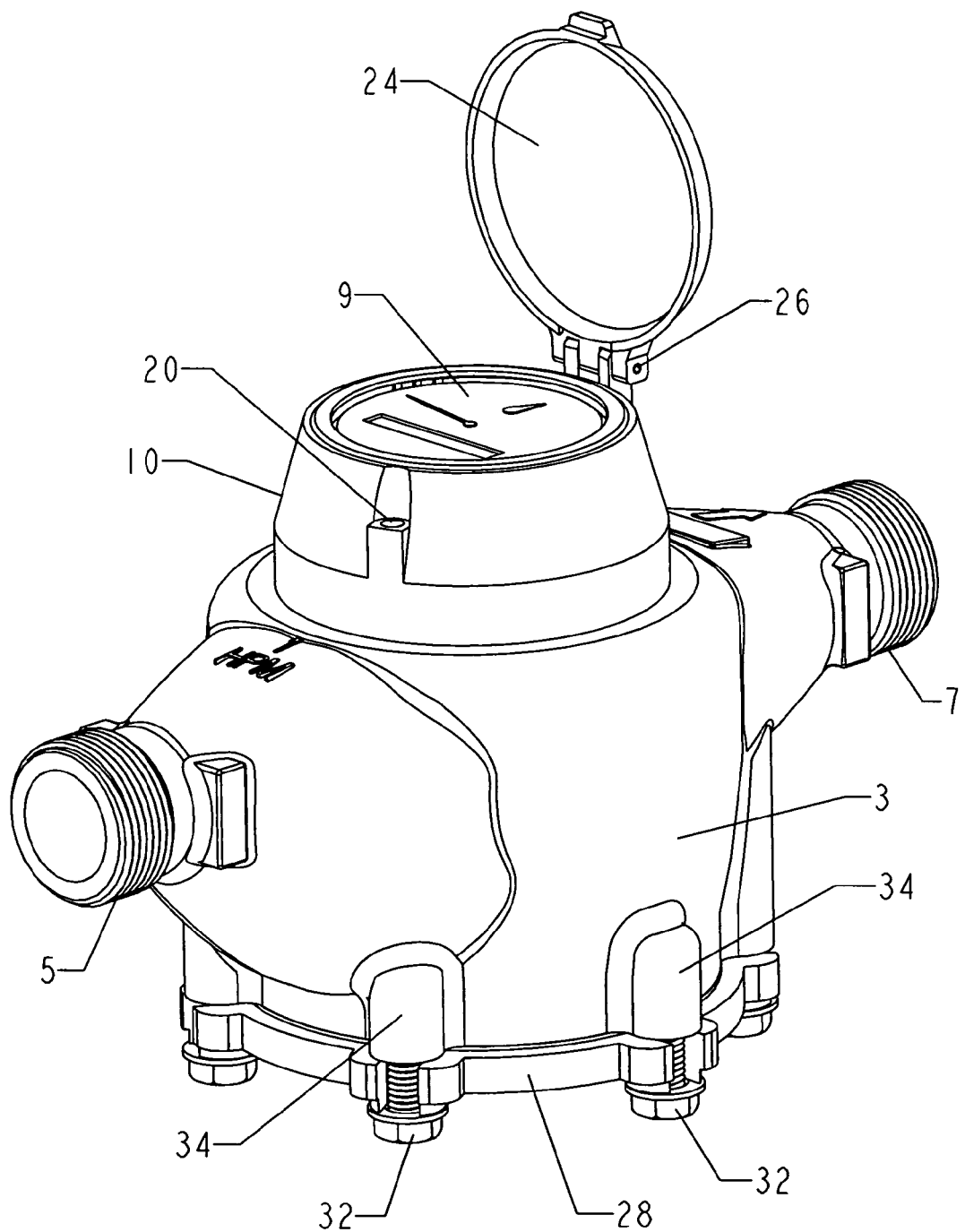
FIG. 1 shows a large volume fire service water meter according to a preferred embodiment of this invention.
Figure 2:
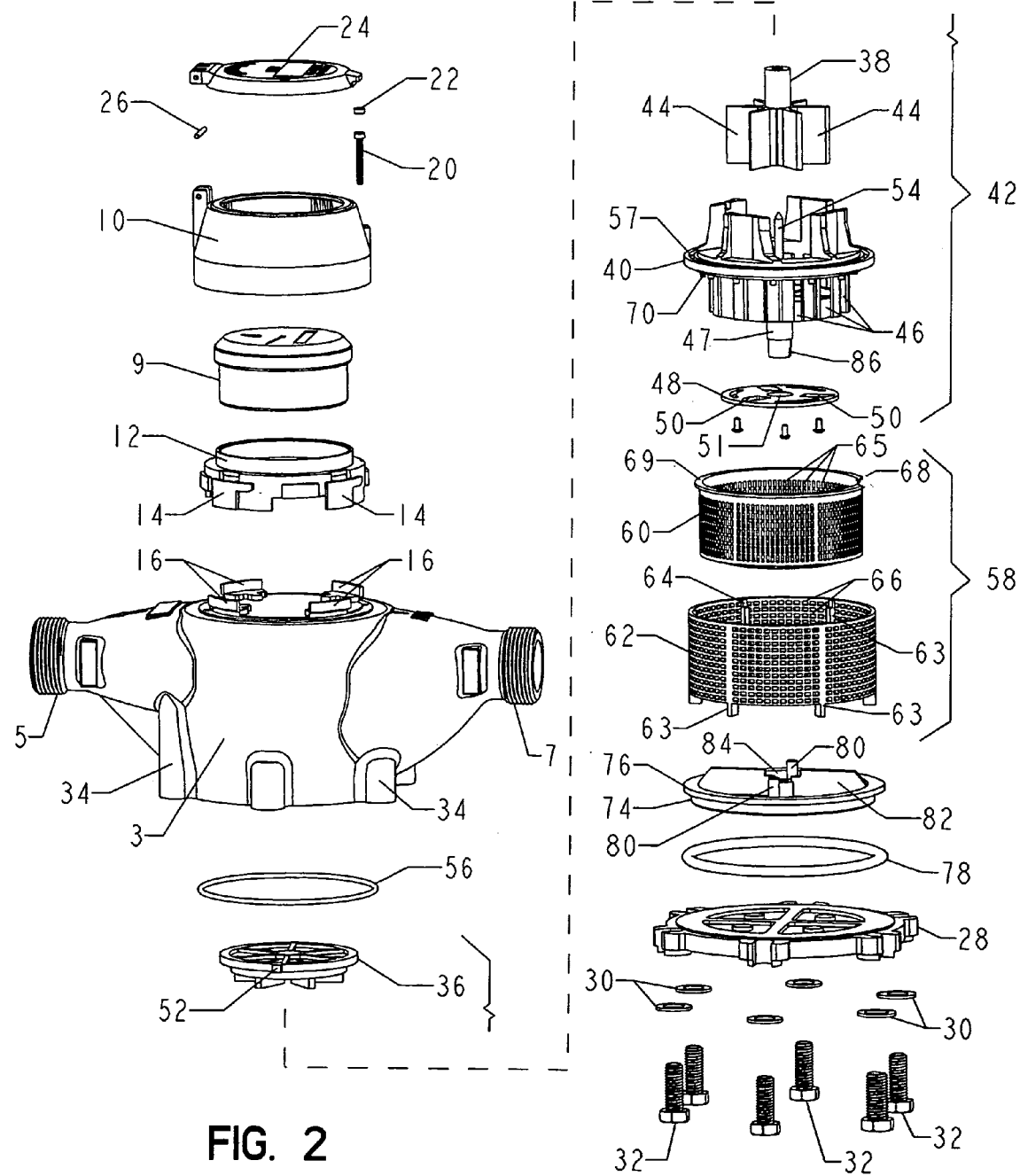
FIG. 2 is an exploded view by which to illustrate an adjustable flow control turbine assembly and a dual element strainer assembly of the fire service water meter of FIG. 1 to be coupled together so as to provide an accurate measurement of water consumption and an uninterrupted flow.

FIGS. 1 and 2 of the drawings illustrate a preferred embodiment for a large volume fire service water meter which forms the present invention. The water meter 1 includes a hollow body 3 that lies in fluid communication with axially aligned inlet and outlet ports 5 and 7. The inlet and outlet ports 5 and 7 are shown having a set of screw threads by which to enable the water meter 1 to be integrated within the framework of a fire suppression system. However, the threaded ports 5 and 7 may be replaced by smooth bores surrounded by coupling flanges (not shown). A standard magnetically driven water register 9 is coupled to the top of the body 3 so as to provide a visual indication of the volume of water (e.g., in cubic feet or meters) consumed by a residential user. The register 9 is surrounded by a (e.g., brass or plastic) shroud 10. A shroud retaining ring 12 is detachably connected to the body 3 so as to couple the shroud 10 and the register 9 surrounded by shroud 10 to the water meter 1.

That is, the register 9 is received at the interior of the shroud retaining ring 12, and the shroud 10 is seated on top of ring 12. Projecting outwardly from the shroud retaining ring 12 is a set of locking tabs 14. The locking tabs 14 are adapted to be rotated into mating engagement with a corresponding set of catches 16 that project upwardly from the top of body 3 by which the shroud retaining ring 12, the register 9 and the shroud 10 are all attached to the body 3 of water meter 1. A register screw 20 is inserted to hold the register shroud 10 against the shroud retaining ring 12. A tamper seal 22 may be used to cover the head of register screw 20 so as to indicate any attempt to remove screw 20 in an effort to gain unauthorized access to and thereby alter the reading of the register 9 surrounded by the register shroud 10.

One end of a rotatable register cover 24 is pivotally connected to the register shroud 10 by means of a pivot pin 26 so as to cover and protect the register 9. The cover 24 may be rotated off the register shroud 10 when it is desirable to have visual access to the register 9 in order to obtain a reading of water consumption.

An adjustable flow control turbine assembly 42 is removably received within the hollow body 3 of water meter 1 through an entry opening (not shown) that is created when a bottom plate 28 is removed from the bottom of body 3. The bottom plate 28 is removably connected to the body 3 by means of threaded bolts 32 (and their corresponding washers 30) to be received within respective threaded sockets 34 that are spaced from one another around the body 3. The adjustable flow control turbine assembly 42 of water meter 1 includes a calibration cap 36, a rotor or impeller 38, and a base or impeller housing 40 within which a rotor 38 is mounted for rotation. The calibration cap 36, rotor 38 and base 40 of the adjustable flow control turbine assembly 42 of water meter 1 have been previously described in my prior U.S. Pat. No. 6,345,541 issued Feb. 12, 2002, the details of which are hereby incorporated by reference. Therefore, only a brief description of the adjustable flow control turbine assembly 42 will be provided herein.

The adjustable flow control turbine assembly 42 is capable of controlling the rate at which water is delivered to the rotor 38 thereof from a high pressure source (e.g., a water service pipe associated with the fire suppression system), so as to strike the impeller blades 44 of the rotor 38 at the interior of hollow body 3 via flow passages 46 that are located around the base 40 and one or more variable water inlet orifices (not shown) that are formed through the bottom of the base 40. A position adjustable calibration plate 48 having a set of flow regulating apertures 50 formed therein is affixed (by means of removable fasteners) to the bottom of the base 40 of turbine assembly 42. The velocity of the water supplied to the rotor 38 depends upon the position of the calibration plate 48 and the alignment of the flow regulating apertures 50 thereof so as to correspondingly vary the size of the water inlet orifices through the bottom of base 40.

A protrusion 52 projects outwardly from the calibration cap 36 to enable the turbine assembly 42 to be properly oriented within the hollow body 3 of water meter 1. A measuring chamber O-ring seal 56 is located in an annular groove 57 formed in the base 40 to prevent leakage when the turbine assembly 42 is located within body 3. The position of the flow passages 46 and the size of the water inlet orifices through the base 40 are selectively adjusted until a smooth, linear (i.e., non-pulsating) stream of water is directed from the inlet port 5 to the impeller blades 44 of rotor 38 to cause the blades 44 to rotate around a rotor shaft 54. The register 6 is responsive to the rotation of impeller blades 44 to provide an indication of the volume of water consumption in the usual manner. However, by virtue of the water smoothing effect produced by the turbine assembly 42, the register 6 can more accurately measure the volume of water flowing between the inlet and outlet ports 5 and 7 of water meter 1.

In accordance with the present improvement, a dual element strainer assembly 58 is coupled to the bottom of the turbine assembly 42 at the interior of hollow body 3 of water meter 1. The strainer assembly 42 is preferably manufactured from polystyrene, or the like. The dual element strainer assembly 58 includes a basket-shaped inner strainer 60 and a cylindrical outer strainer 62. The basket-shaped inner strainer 60 has an open top and a perforated bottom. In the assembled relationship, the basket-shaped inner strainer 60 is received inwardly of the cylindrical outer strainer 62. To facilitate this assembly, the top and bottom of the cylindrical outer strainer 62 are open to accommodate the receipt of the inner strainer 60 therewithin.

The spacing (designated 56 in FIG. 4) between the inner and outer strainers 60 and 62 is preferably about ¼ to ⅜ inches. A series of radially inward projecting ribs 63 are spaced from one another around the periphery of the outer strainer 62. The ribs 63 run longitudinally along the inside of the outer strainer 62 so as to engage the inner strainer 60 and thereby hold the inner and outer strainers 60 and 62 in spaced coaxial alignment with one another. The width of the ribs 63 determines the spacing 56 between the inner and outer strainers 60 and 62.

The top of each rib 63 extending along the outer strainer 62 has a seat 64 formed therein. A peripheral lip 69 surrounds the open top of the inner strainer 60. In the assembled relationship, the peripheral lip 69 is received within the seats 64 that are formed in the ribs 63 of outer strainer 62 when the inner strainer 60 is moved through the open top of outer strainer 62. In this regard, it may be appreciated that the ribs 63 running longitudinally along the inside of the outer strainer 62 and the seats 64 that are formed at the tops of the ribs 63 cooperate with one another to maintain the spaced coaxial alignment of the inner and outer strainers 60 and 62 of the dual element strainer assembly 58.

Each of the inner and outer strainers 60 and 62 has a plurality of openings 65 and 66 formed therein to maximize the volume of water that may flow through the strainer assembly 58 at any given time. It is important that the size (i.e., total area) of the openings through the inner strainer 62 be larger than the area of the openings 65 through the inner strainer 60. By virtue of the foregoing, sand and other particulate matter in suspension will be removed from the incoming stream of water by the outer strainer 62 so as not to impede the flow or reduce the pressure of the flow to turbine assembly 42 at which water consumption will be measured.

To couple the dual element strainer assembly 58 to the turbine assembly 42, a registration notch 68 is formed in the peripheral lip 69 extending around the open top of the basket-shaped inner strainer 60. The registration notch 68 is sized to receive and capture an index pin 70 which projects downwardly from the base 40 of turbine assembly 42. The receipt of index pin 70 in registration notch 68 prevents the strainer assembly 58 from rotating relative to the turbine assembly 42. At the same time, a spindle 47 which projects downwardly from the base 40 of turbine assembly 42 is received through a hole 51 formed in the calibration plate 48 and an axially aligned hole (not shown) formed through the perforated bottom of the basket-shaped inner strainer 60.

Figure 3:
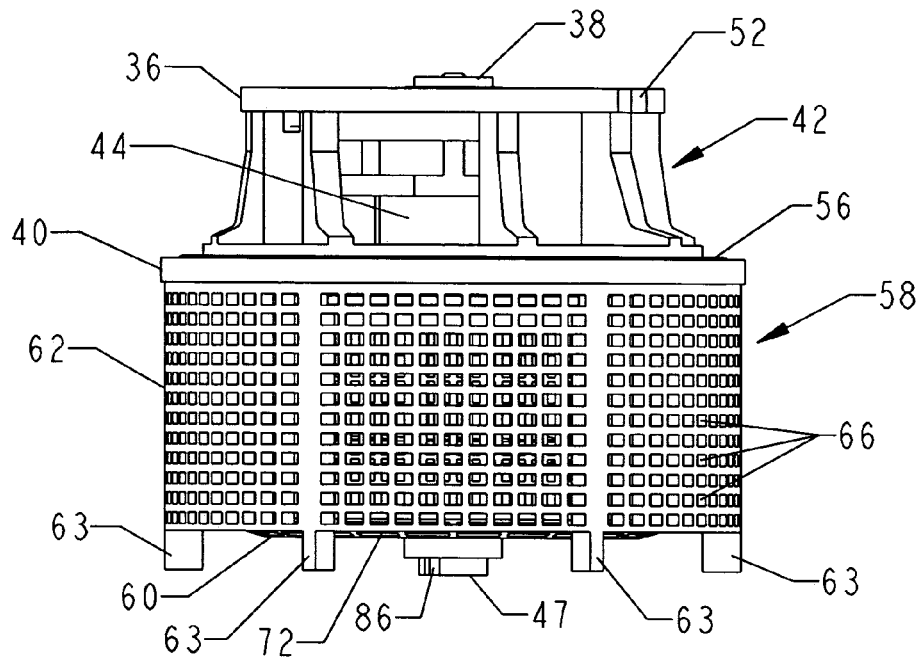
FIG. 3 shows a side view of the turbine assembly received within and coupled to the strainer assembly to be located at the interior of the water meter.
Figure 4:
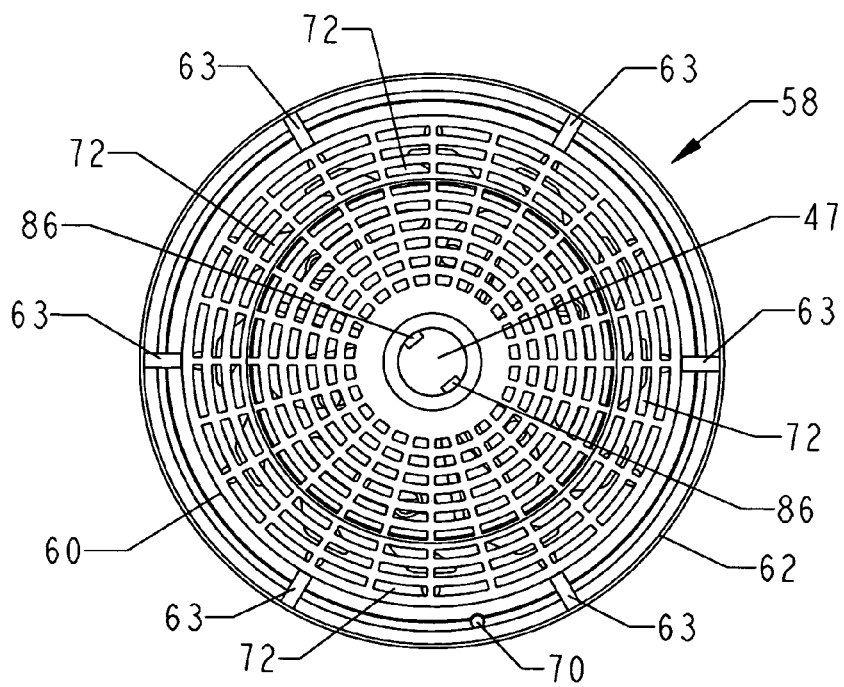
FIG. 4 shows a bottom view of the turbine assembly coupled to the strainer assembly of FIG. 3.

FIGS. 3 and 4 of the drawings show the dual element strainer assembly 58 coupled to the turbine assembly 42 such that the flow passages 46 and the flow regulating calibration plate 50 of the base 40 are surrounded by the inner strainer 60, whereby a continuous stream of water will be delivered to the rotor 38 to cause the impeller blades 44 thereof to rotate around the rotor shaft 54 to indicate the volume of water consumed by the user. More particularly, the water through the hollow body 3 of the fire service water meter 1 flows from the source through a radially extending path from inlet port 5 to the base 40 of turbine assembly 42 via the openings 65 and 66 that are formed in the sides of the inner and outer strainers 60 and 62. In addition, the water will also flow through an axial path from inlet port 5 under the strainer assembly 58 and upwardly to the turbine assembly 42 via perforations 72 through the bottom of the basket-shaped inner strainer 60 and the open tops of the inner and outer strainers 60 and 62. The radial and axial flow paths through strainer assembly 58 produce a load pressure that is evenly distributed at the impeller blades 44 of turbine assembly 42.

Referring concurrently to FIGS. 1–4, the combination of the dual element strainer assembly 58 coupled to the turbine assembly 42 is seated upon a generally dish-shaped strainer assembly support plate 74. The strainer assembly support plate 74 has a flat bottom which lays against the earlier described bottom plate 28 when such bottom plate 28 is fastened to the body 3 of water meter 1 (by means of bolts 32) to close the entry opening in the bottom thereof through which the turbine assembly 42 and strainer assembly 58 are moved. An outwardly extending lip 76 runs around the periphery of the dish-shaped strainer assembly support plate 74. An O-ring seal 78 lies below the peripheral lip 76 in surrounding engagement with the bottom of plate 74. With the bottom plate 28 secured to the bottom of the body 3 and pressing against the strainer assembly support plate 74, the O-ring seal 78 will prevent the leakage of water past the interface between the plates 28 and 74.

A pair of support posts 80 and a wall 82 (best shown in FIG. 2) project upwardly from the strainer assembly support plate 74, whereby to engage the perforated bottom 72 of the basket-shaped inner strainer 60 of strainer assembly 58. The wall 82 extends across the strainer assembly support plate 74 between the pair of support posts 80. The previously described ribs 63 that run longitudinally along the outer strainer 62 extend below the strainer assembly 58 to rest upon the strainer assembly support plate 74. Accordingly, in the assembled water meter configuration, the support posts 80 and the wall 82 project upwardly from strainer assembly support plate 74 to engage the strainer assembly 58, and the ribs 63 project downwardly from the strainer assembly 58 to engage the strainer assembly support plate 74, whereby the strainer assembly 58 stands upwardly from the strainer assembly support plate 74 to create a space therebetween in order to enable the inlet water to flow upwardly and axially through the perforated bottom 72 of the inner strainer 60 to the base 40 of the turbine assembly 42.

A spindle mounting recess 84 is established at the midpoint of the wall 82 that extends across the strainer assembly support plate 74. The spindle 47 which projects downwardly from the base 40 of turbine assembly 42 through the hole 51 in calibration plate 48 and outwardly through the perforated bottom of the inner strainer 60 (best shown in FIGS. 3 and 4) is seated within the spindle mounting recess 84. One or more locating notches 86 is formed in the spindle 47 to help seat the spindle 47 within the spindle mounting recess 84 in wall 82, whereby the turbine assembly 42, the strainer assembly 58 and the strainer assembly support plate 74 are all interconnected with one another. By virtue of the foregoing, an efficient water flow control, measuring and straining unit is assembled to be located at the interior of the hollow body 3 of fire service water meter 1.

By virtue of the dual element strainer assembly 58 interconnected between the turbine assembly 42 and the strainer assembly support plate 74, the water meter 1 herein disclosed is adapted to accommodate and measure a large volume of high velocity flow which could be encountered in those cases where the water meter is used to communicate with a sprinkler system for fire service applications. That is, the inner and outer strainers 60 and 62 having openings 65 and 66 of different sizes are capable of removing suspended particles without interrupting the flow so as to assure a continuous stream of water at those times when it is needed the most. Likewise, the water meter 1 will be sufficiently sensitive to measuring smaller volume, lower velocity flows of the kind that are common to normal residential use during periods of calm. Therefore, it is to be understood that water meter 1 may also be used in residential and commercial applications other than those relating to fire service. In either case, the water meter 1 has a measuring chamber that is disposed within radial and axial extending flow paths so as to be unlikely to introduce pressure losses in the flow and thereby avoid the failures that have heretofore been experienced by conventional positive displacement water meters.

I claim:

1. A high volume water meter, comprising:
    a water meter body having inlet and outlet ports between which a flow path is established;
    a register attached to said water meter body to provide an indication of the volume of water flowing along said flow path between said inlet and outlet ports;
    a turbine assembly located within said flow path and responsive to the water flowing therealong, said turbine assembly communicating with said register; and
    a dual element strainer assembly located within said flow path ahead of said turbine assembly, said dual element strainer assembly comprising an inner strainer and an outer strainer surrounding and spaced from said inner strainer to remove particulate matter from the water flowing along said flow path to said turbine assembly.

2. The high volume water meter recited in claim 1, wherein the inner and outer strainers of said dual element strainer assembly are detachably connected to one another.

3. The high volume water meter recited in claim 1, wherein the outer strainer of said dual element strainer assembly has a series of ribs running therealong and projecting inwardly thereof, said ribs engaging said inner strainer to retain said inner strainer within said outer strainer.

4. The high volume water meter recited in claim 3, wherein each rib of said series of ribs running along the outer strainer of said dual element strainer assembly has a seat formed therein and said inner strainer has a lip projecting outwardly therefrom, said lip being received within the seats formed in said series of ribs to position said inner strainer within said outer strainer.

5. The high volume water meter recited in claim 3, further comprising a strainer assembly support located within said hollow body, the series of ribs running along said outer strainer extending beyond said dual element strainer assembly and resting upon said strainer assembly support, such that said outer strainer and said inner strainer surrounded by said outer strainer stand upwardly from and are spaced above said strainer assembly support to enable the water flow path to extend under said strainer assembly.

6. The high volume water meter recited in claim 5, wherein said turbine assembly is located within the inner strainer of said dual element strainer assembly so as to lie in the water flow path behind said strainer assembly.

7. The high volume water meter recited in claim 6, wherein said turbine assembly has an index pin projecting therefrom and the inner strainer of said dual element strainer assembly has a registration notch formed therein, said index pin being received by said registration notch when said turbine assembly is located within the inner strainer.

8. The high volume water meter recited in claim 6, wherein said turbine assembly has a spindle projecting downwardly therefrom and extending through said dual element strainer assembly for receipt by said strainer assembly support by which said turbine assembly stands upwardly from said strainer assembly support for receipt within said inner strainer.

9. The high volume water meter recited in claim 8, wherein said strainer assembly support has a spindle mounting recess formed therein, the spindle projecting downwardly from said turbine assembly through said dual element strainer assembly being received at said spindle mounting recess.

10. The high volume water meter recited in claim 1, wherein the inner strainer of said dual element strainer assembly includes an open top, a perforated bottom and a cylindrical side having a plurality of openings formed therethrough.

11. The high volume water meter recited in claim 10, wherein the outer strainer of said dual element strainer assembly includes an open top, an open bottom and a cylindrical side having a plurality of openings formed therethrough, said inner strainer being held in spaced coaxial alignment within said outer strainer.

12. The high volume water meter recited in claim 11, where the plurality of openings formed through the side of said outer strainer have a larger area than the plurality of openings formed through the side of said inner strainer.

13. The high volume water meter recited in claim 11, wherein the water flow path through said water meter body between said inlet and outlet ports runs radially through said dual element strainer assembly by way of the sides of said coaxially aligned inner and outer strainers and axially through said dual element strainer assembly by way of the open bottom of said outer strainer and the perforated bottom of said inner strainer.

14. For a high volume water meter including a water meter body having inlet and outlet ports and a water flow path established therebetween and a register attached to said body to provide an indication of the volume of water flowing along said flow path between said inlet and outlet ports, the combination comprising:

a turbine assembly located within said flow path and responsive to the water flowing therealong, said turbine assembly communicating with said register; and a dual element strainer assembly located within said flow path ahead of said turbine assembly, said dual element strainer assembly comprising an inner strainer and an outer strainer surrounding and spaced from said inner strainer to remove particulate matter from the water flowing along said flowpath to said turbine assembly, said turbine assembly being received within said inner strainer.

15. The combination recited in claim 14, further comprising a strainer assembly and turbine assembly support located within said water meter body, said dual element strainer assembly standing upwardly from and spaced above said strainer assembly and turbine assembly support, and said turbine assembly within the inner strainer of said dual element strainer assembly having a spindle projecting downwardly therefrom and extending through said strainer assembly for receipt at said strainer assembly and turbine assembly support so that the water flow path to said turbine assembly extends under said strainer assembly.

16. The high volume water meter recited in claim 14, where the inner strainer of said dual element strainer assembly includes an open top, a perforated bottom and a cylindrical side having a plurality of openings formed therethrough.

17. The high volume water meter recited in claim 16, wherein the outer strainer of said dual element strainer assembly includes an open top, an open bottom, and a cylindrical side having a plurality of openings formed therethrough, said inner strainer being held in spaced coaxial alignment within said outer strainer.

18. The high volume water meter recited in claim 17, wherein the plurality of of openings formed through the side of said outer strainer have a larger area than the plurality of openings formed through the side of said inner strainer.

19. The high volume water meter recited in claim 17, wherein the water flow path through said water meter body between said inlet and outlet ports runs radially through said dual element strainer assembly by way of the sides of said coaxially aligned inner and outer strainers and axially through said dual element strainer assembly by way of the open bottom of said outer strainer and the perforated bottom of said inner strainer.

* * * * *